United States Patent
Buchanan

[11] 3,733,981
[45] May 22, 1973

[54] LENS PROTECTIVE SYSTEM FOR DEEP SEA CAMERA

[75] Inventor: Chester L. Buchanan, Camp Springs, Md.

[73] Assignee: The United States of America as represented by the Secretary of the Navy, Washington, D.C.

[22] Filed: July 17, 1972

[21] Appl. No.: 272,244

[52] U.S. Cl.............................................95/11 UW
[51] Int. Cl..............................................G03b 17/08
[58] Field of Search ...............................95/11 UW

[56] References Cited
UNITED STATES PATENTS
2,256,133  9/1941  Barnes........................................95/11

FOREIGN PATENTS OR APPLICATIONS
969,065  4/1958  Germany....................................95/11

Primary Examiner—John M. Horan
Attorney—R. S. Sciascia et al.

[57] ABSTRACT

A lens arrangement for a camera useful in deep sea photography. An optical coupling fluid is provided between a protective window and the lens which absorps the pressure to protect the lens thereby permitting the use of thinner lens materials.

5 Claims, 1 Drawing Figure

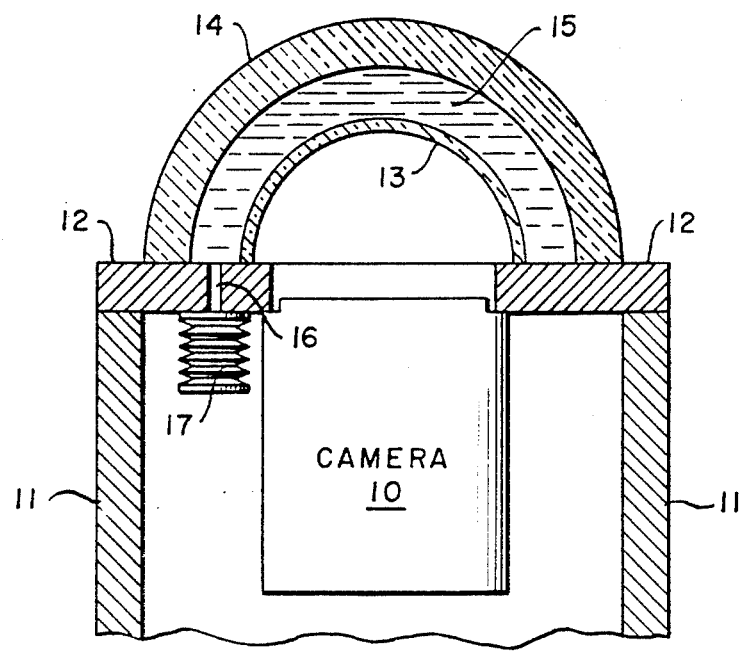

LENS PROTECTIVE SYSTEM FOR DEEP SEA CAMERA

BACKGROUND OF THE INVENTION

This invention is directed to a camera lens for deep sea photography and more particularly to a protective means which permits use of thinner optical materials as the protective window.

Heretofore, cameras with thin optical lens have been limited in the depth at which they could be safely used because of leakage or damage to the lens. Therefore, in order to withstand the pressure at great deeps the lenses are usually very thick and considerable distortion is caused by the pressure of the depths.

SUMMARY OF THE INVENTION

This invention makes use of a protective casing for a deep sea camera in which the lens is protected by a pressure resistant window separated from the lens by a fluid coupling. An accumulator is provided in combination with the fluid so that pressure on the protective window will be transmitted to the fluid whose pressure is controlled by the accumulator. Therefore, the pressure will not be transmitted to the camera lens but to the fluid coupling and accumulator.

STATEMENT OF THE OBJECTS

It is therefore an object of the present invention to provide a deep sea camera system in which the camera lens is not affected by the pressure of the depths.

Another object is to provide a deep sea camera system which will permit usage of thinner pressure resistant protective windows.

Still another object is to provide a deep sea camera system that prevents optical distortion of the camera lens.

Yet another object is to provide a protective window system for a deep sea camera which permits use of thinner protective window materials than therebefore.

While still another object is to provide a deep sea camera system with a smaller and light weight protective window which may be made of a variety of materials.

Other objects and advantages will become more obvious from reading the following specification with reference to the drawing.

BRIEF DESCRIPTION OF THE DRAWINGS

FIG. 1 illustrates a cross-sectional view of a window-lens system of a high pressure camera housing shown partially.

DETAILED DESCRIPTION

Now referring to the drawing, there is shown by illustration in FIG. 1, a partial cross-sectional view of the several elements which make-up the structure of this invention. As shown, a camera 10 is secured within a pressure housing which is capable of withstanding the high pressures at great depths within the deep waters. The housing includes a body 11 with a front plate or bulkhead 12 to which an optical lens 13 is mounted. The optical lens is protected by a pressure resistant optically clear window 14 made of a material that has substantially the same index of refraction as that of water. The pressure resistant window is mounted outwardly of the camera lens to provide a spacing therebetween.

An optically clear fluid 15 such as distilled degassed water or any other fluid having approximately the same index of refraction as that of the surrounding water is placed within the spacing between the outer protective window and the camera lens. The partition 12 is provided with an aperture 16 that communicates between the spacing between the protective window and the camera lens and an accumulator 17 which contains the optically clear fluid 15 therein. The accumulator may be provided with a filler plug for admitting the fluid.

The accumulator is expandable within the pressure housing and is so adjusted that the pressure of the optically clear fluid will always remain at about one atmosphere of pressure. Therefore, as the pressure on the protective window increases, the pressure of the optically clear fluid remains constant. Likewise, the pressure on the camera lens would remain constant.

The housing may be so shaped and made of a material that will withstand the pressure of the deep waters whereas the lens and protective window are shown generally as a hemispherical shell.

In operation, a loaded camera is secured within the housing and so configured for operation at great deeps. As the camera is lowered to greater depths, greater pressure will be exerted onto the protective window and housing. Any pressure on the window that is communicated to the inside will be applied to the optical fluid between the protective window and the camera lens. As pressure is applied to the protective window with any distortion toward the inside, the spacing between the protective window and the camera lens will become less. As the spacing becomes less, pressure is applied onto the optical fluid within the spacing. As pressure is applied to the optical fluid, some of the fluid is forced into the accumulator. Since the accumulator is made to expand and maintain a fluid pressure of one atmosphere, the accumulator will be expanded accordingly and the pressure of the optical fluid will remain at one atmosphere. As pressure is relieved on the protective window, the accumulator will contract, thereby forcing the fluid back into the spacing between the protective window and camera lens. Thus, the camera lens will operate with a constant one atmosphere pressure on the lens.

Since there is a constant one atmosphere pressure on the camera lens, there is no distortion of the camera lens. Also, since the lens is not subjected to the pressures of the deep water, the lens may be made of thin good quality optical materials without regard to the ocean depths at which the camera operates.

In great deeps, the protective window will be subjected to great pressure which may deform or distort the window; however, the window is made of a material of substantially the same optical qualities as that of water and since water is on both sides of the window, the distortion of the window will have little, if any, optical effect on the system.

The accumulator may be of any suitable type, that will maintain one atmosphere of pressure. One such type could be a bellows with a constant tension spring which will permit expansion of the bellows when pressure is applied to the fluid and to return the bellows when pressure is relaxed on the fluid.

The drawing has been shown with the pressure window and camera lens integral with the pressure housing front plate with the camera secured within the housing relative to the camera lens when desired. The system may be made such that the camera is secured to the front plate 12 in optical alignment with the lens and the front plate be a part of the camera housing. In this way, the front plate would be mounted onto the housing when desired and the optics between the camera and lens will not be disturbed when removing the camera from the pressure housing. In this arrangement, pressure seals would be required between the front plate and the pressure housing to avoid leakage. The accumulator would be secured to the front plate and be removable with the camera.

Obviously many modifications and variations of the present invention are possible in the light of the above teachings. It is therefore to be understood that within the scope of the appended claims the invention may be practiced otherwise than as specifically described.

What is claimed is:

1. A system for protecting the optical lens of a camera used in a high pressure medium; which comprises,
   a camera useful for high pressure photography,
   an optical lens for admitting optical images into said camera,
   a protective window overlying said optical lens and spaced therefrom to provide a spacing therebetween,
   support means to which said optical lens and said protective window are secured,
   an accumulator for maintaining equal pressure on said optical lens,
   a passage through said support means communicating between the spacing between said protective window and said optical lens and said accumulator, and
   an optical clear fluid filling said spacing between said protective window and said optical lens and said accumulator.

2. A system as claimed in claim 1; wherein,
   said protective window is made of a material having an index of refraction substantially that of the high pressure medium within which the camera is to be used.

3. A system as claimed in claim 2; wherein,
   said accumulator maintains a fluid pressure in the spacing between said protective window and said camera lens of about one atmosphere.

4. A system as claimed in claim 1; wherein,
   the optically clear fluid is water and the pressure medium is water.

5. A system as claimed in claim 4; wherein,
   said camera, lens and protective window are assembled as an integral unit.

* * * * *